(No Model.)

W. N. WHITELEY.
HARVESTER AND BINDER.

5 Sheets—Sheet 1.

No. 376,763. Patented Jan. 24, 1888.

Witnesses:
J. C. Turner.
E. C. Ford.

Inventor:
William N. Whiteley,
By his atty
R. O. Smith (No Model.) 5 Sheets—Sheet 3.

W. N. WHITELEY.
HARVESTER AND BINDER.

No. 376,763. Patented Jan. 24, 1888.

Witnesses:
J. C. Turner
E. C. Ford

Inventor:
W. N. Whiteley
By his atty
R. S. Smith (No Model.)   W. N. WHITELEY.   5 Sheets—Sheet 4.
HARVESTER AND BINDER.

No. 376,763.   Patented Jan. 24, 1888.

Witnesses:
J. C. Turner
E. C. Ford

Inventor:
W<sup>m</sup> N. Whiteley
By his atty
R. S. O. Smith (No Model.) 5 Sheets—Sheet 5.

W. N. WHITELEY.
HARVESTER AND BINDER.

No. 376,763. Patented Jan. 24, 1888.

Witnesses:

Inventor:

UNITED STATES PATENT OFFICE.

WILLIAM N. WHITELEY, OF SPRINGFIELD, OHIO.

HARVESTER AND BINDER.

SPECIFICATION forming part of Letters Patent No. 376,763, dated January 24, 1888.

Application filed April 18, 1884. Serial No. 128,464. (No model.)

*To all whom it may concern:*

Be it known that I, WILLIAM N. WHITELEY, of Springfield, in Clark county, and State of Ohio, have invented new and useful Improvements in Harvesters and Binders; and I do hereby declare that the following is a full and accurate description of the same.

This invention relates to that class of binders known as "low-down binders;" and it consists, principally, in the frame which supports the cutting apparatus, the platform, conveyer, and the binder located in rear of and crossing behind the main wheel and balanced on the main axle, and also in the structure and arrangement of several devices hereinafter particularly described, reference being had to the accompanying drawings, wherein—

Figure 1:
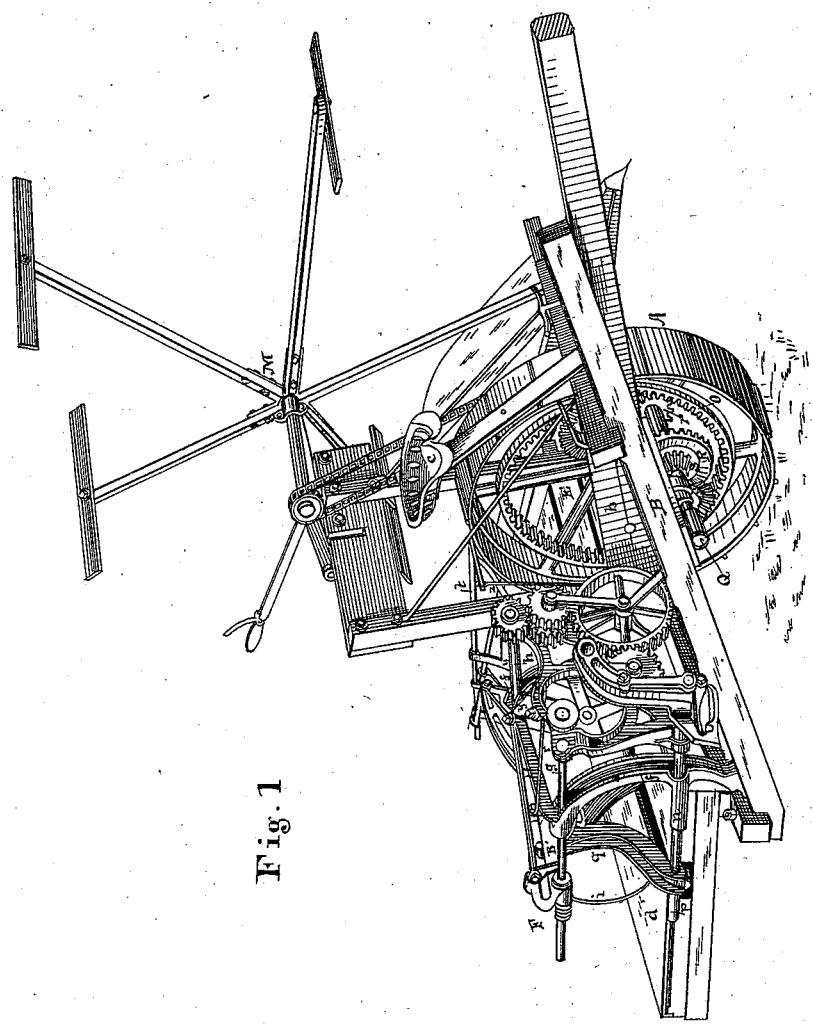
Figure 2:
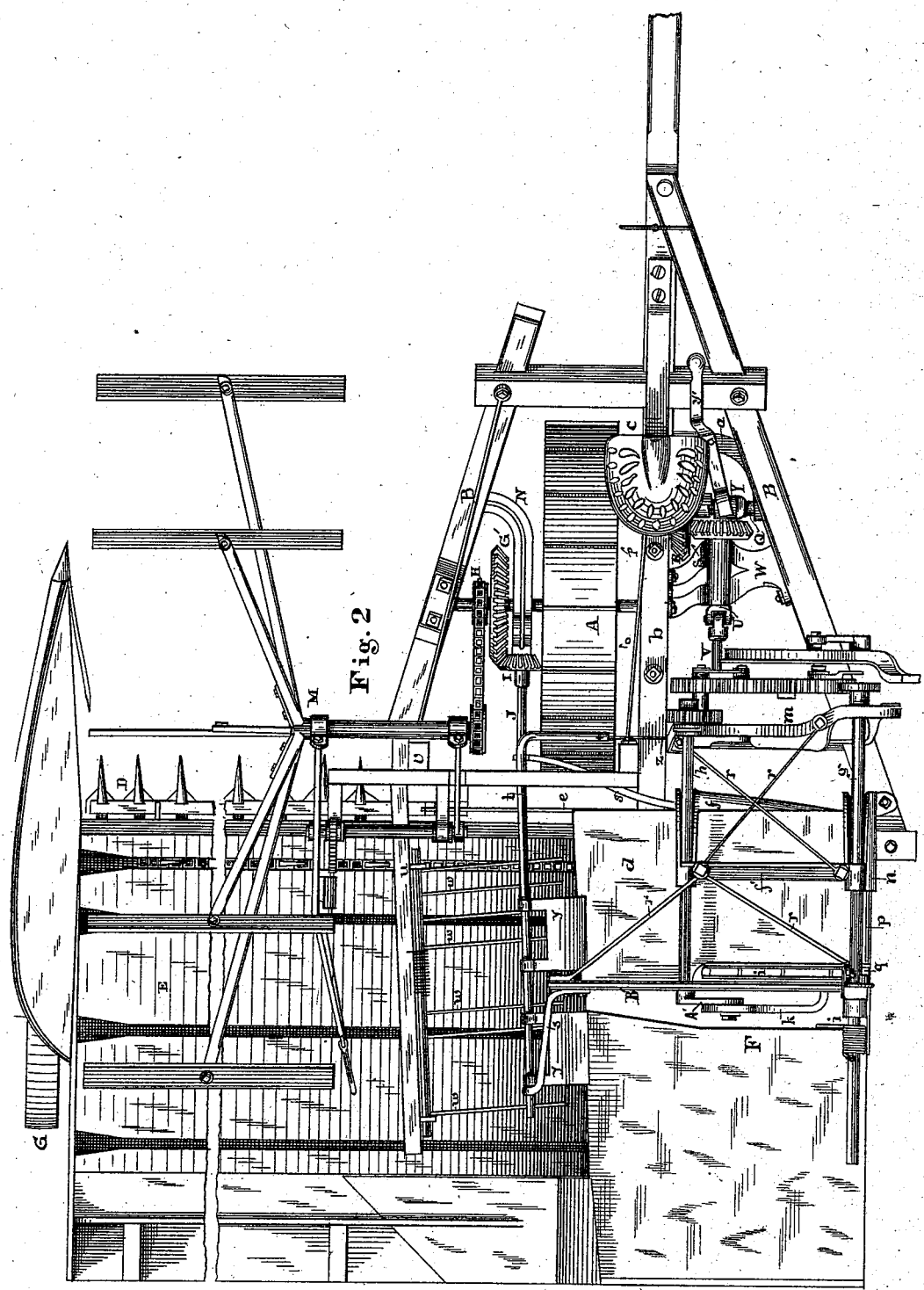
Figure 3:
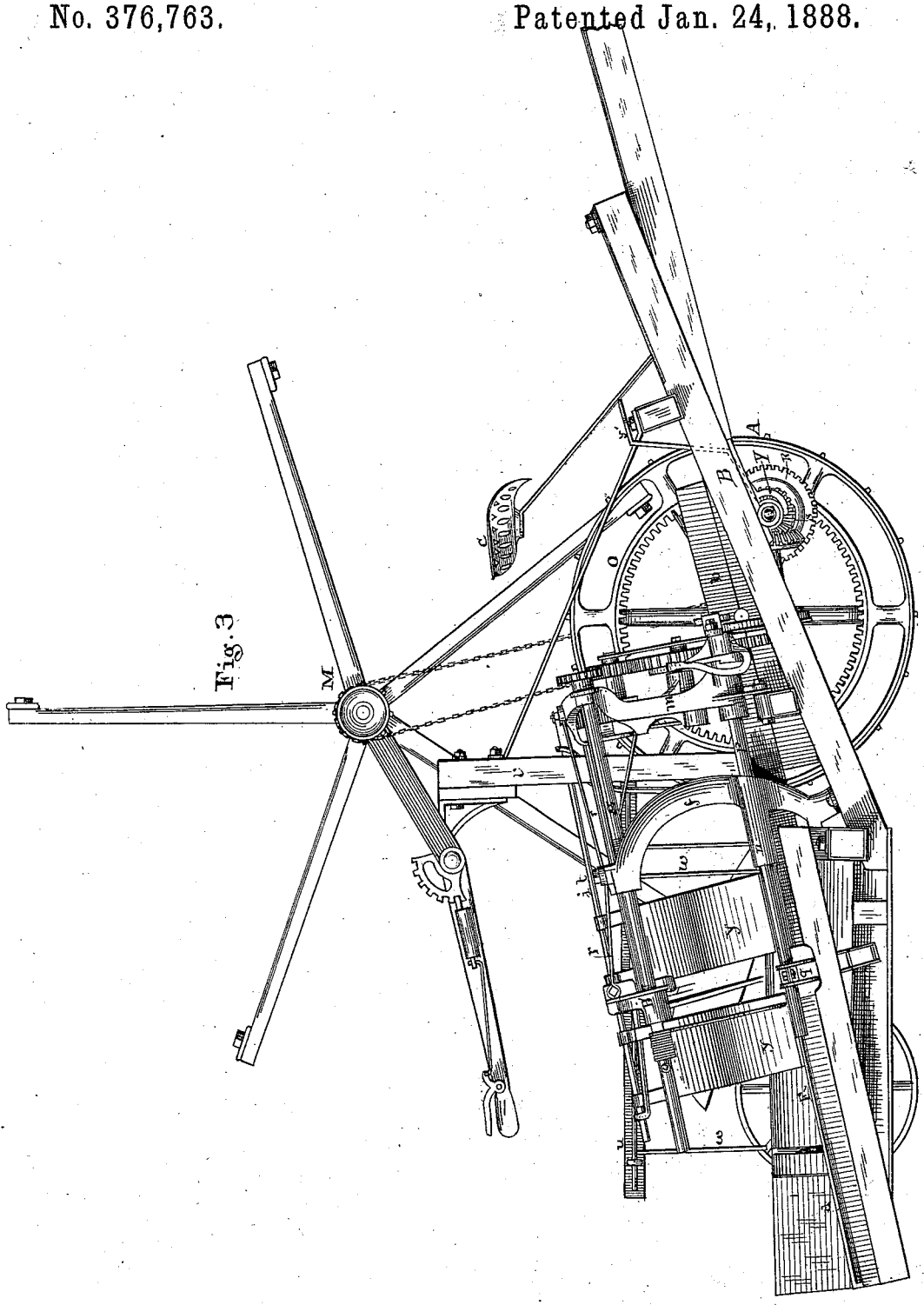
Figure 4:
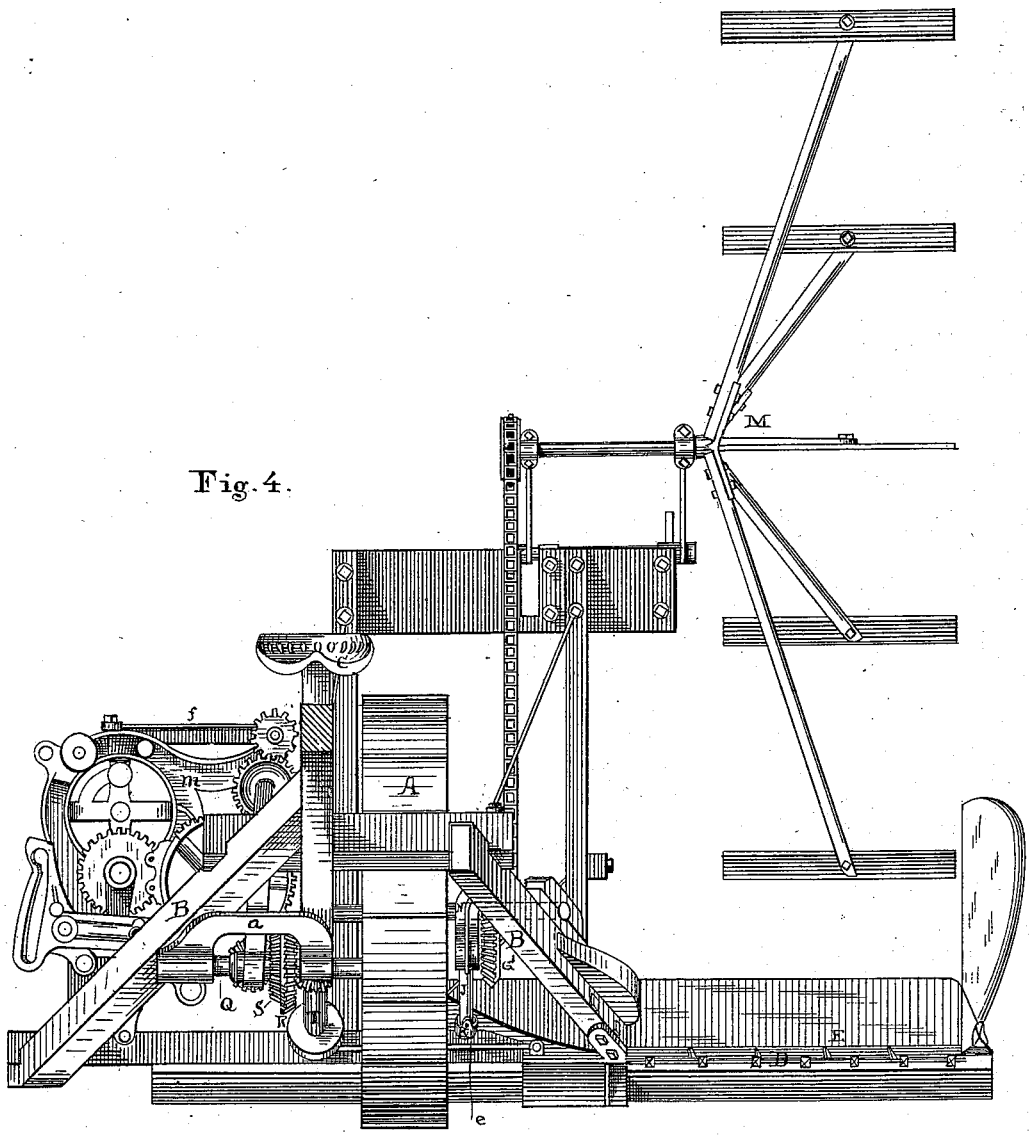
Figure 5:
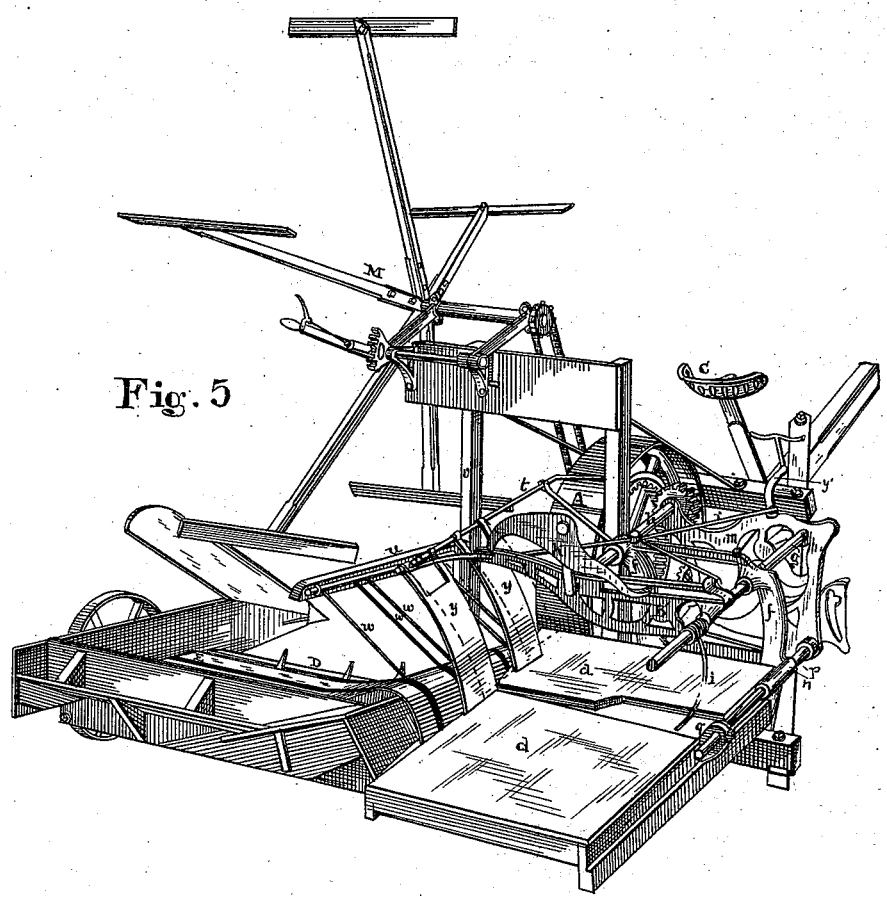

Figure 1 is a perspective view of my machine from the front. Fig. 2 is a plan view of the same. Fig. 3 is a side elevation. Fig. 4 is a front elevation. Fig. 5 is a perspective from the rear.

A is the main supporting and driving wheel, and B is the main-wheel frame, on which also the primary gearing is mounted. The driver's seat C is mounted on said frame in advance of the wheel A, and the platform-frame, carrying the cutting apparatus D, conveyer E, and binder F, is secured to the rear of said main-wheel frame transversely across its rear end back of the main wheel.

The weight of the machine is principally carried and balanced on the axle of the main wheel A, a part of it being supported on the grain-wheel G, the weight of that part of the machine in rear of a line between said wheels being counterbalanced by that part of machine including the reel and gearing in front of said line assisted by the weight of the driver.

Machines having automatic binder attachments have been heretofore constructed with elevators to carry the cut grain from the platform on one side over the main wheel to the binder on the other side. They have also occasionally been constructed with the binding attachments between the wheel and the conveyer-platform, and also supplemental supporting-wheels have been employed to carry the attachment or a part of its weight. I propose to remedy the disadvantage attending each of these methods by arranging the platform carrying the conveyer in rear of and across the path of the main wheel, so as to avoid lifting the grain over said wheel. I also arrange the binder outside the plane of the main wheel, so as to balance the machine longitudinally transversely upon said main wheel and arrange the platform carrying the conveyer and binder upon a rigid extension of the main-wheel frame, and advance much of the gearing and the driver's weight forward of the axis of the main wheel. By these means the gross weight of the entire machine practically is borne by the main wheel, and therefore the weight of the parts may be reduced to the lowest limit consistent with strength and efficient traction. In executing this design I have included various minor improvements, which will be particularly described.

On the grain side of the main wheel A and carried by the axle of said wheel there is a bevel-wheel, G', and a sprocket-wheel H. The former drives a pinion, I, mounted on the shaft J, which connects by means of a universal joint, K, Fig. 4, with the shaft L of the conveyer E, which, as shown herein, is of the traveling sub-platform toothed-belt variety, but may be of any other kind preferred. The shaft J has its forward bearing in the bracket N, attached to the frame forward of the wheel G'. The sprocket-wheel H carries a chain-belt, whereby the reel M is driven.

The main wheel A is provided on its outer or stubble side with a gear-ring, O, which meshes with the pinion P on the pinion-shaft Q, whereon the bevel-wheels R S are placed, the former driving the cutter crank-shaft T and the latter driving the counter-shaft U, which transmits motion to the shaft V and the gearing of the binder attachment F, a universal joint being interposed between parts of said shafts to prevent any cramp in the bearings in consequence of any lack of rigidity in the frame-work of the machine.

The bracket W is cast integral with the pipe-boxes for the counter-shaft U and the cutter crank-shaft T, and, being securely bolted to the center and outer side bars of the main-wheel frame B, said frame is materially strengthened thereby. It is also still further braced by the plate *a*, which bears at its ends the bearing-boxes for the pinion-shaft Q, and is also bolted to the middle and outer side bars of the frame B.

The mechanism of the binder is thrown into or out of action by means of the clutch Y, the shifting-lever whereof extends to a position where the driver can control it while on his seat.

The machine has a single bearing and driving wheel and a rigid tongue. The frame carrying the cutting apparatus, the conveyer E, and the binder F is supported on a rectangular frame bolted to the rear transverse bar of the main-wheel frame B.

The rectangular frame, which supports the cutting apparatus, conveyer, and binding apparatus, is composed of suitable timbers or sills placed transversely across and in rear of the main-wheel frame B, and is firmly bolted thereto. In addition and to more efficiently support said atttached frame the member $b$ of said frame extends forward above the center member of the main-wheel frame B for a sufficient distance to permit them to be securely fastened together against strains both vertical and lateral. The center member of the main-wheel frame B is moreover in the line of draft, which is thereby transmitted directly to the frame carrying the cutters, the conveyer, and the binder-frame. The cutter is the ordinary kind, and the continuous carrier or conveyer by which the cut grain is conveyed to the binder is operated by the revolution of shaft L, which is raised above the general plane of the conveyer, so that the grain carried by it is sufficiently elevated to deliver it upon the inner side of the binder platform or deck, $d$, which descends toward the rear to facilitate the separation of the heads of the grain and the discharge of the bundle. The elevation of the carrier near to the binder renders it possible to pass the cutter-operating pitman $e$ below the shaft L.

The metallic frame of the binder consists of two parts, first, a frame, $f$, having two standards and transverse members to connect them, the standard being provided with foot-flanges whereby they may be bolted to the outer and middle timbers of wheel-frame B, not only to support said frame $f$, but to materially brace and strengthen the frame B. The standards of frame $f$ curve over backward, and at their tops they are provided with boxes or supports for the shafts $g$ $h$. The former whereof carries the compressor-arm $i$ and the latter carries the divider-rake $k$. By curving said standards, as described and shown, the shafts $g$ $h$ are provided with bearing-boxes above the table or deck $d$, and at the same time said table is left clear and unobstructed for the passage of the butts of the grain; second, a frame, $m$, is likewise bolted to the main-wheel frame B, and the operative gearing for the binding mechanism is all supported on said frame $m$. By this arrangement the weight of the gearing and supporting frame is advanced opposite the outer side of the main wheel near to the axis thereof, so that the front edge of the carrier may pass close to the rear edge of the wheel and the heavy parts of the binding attachment be brought forward and easily balanced. The frame $f$ is also provided with a long pipe-bearing, $n$, for the shaft $p$, which carries and operates the needle arm $q$.

It will be seen that the shafting which operates the binding mechanism lies in planes substantially parallel with the binder-table, which renders it possible both to mount the needle-arm low and the gearing which operates the same at such a higher plane as to permit its clearing obstructions.

Tie-rods $r$ connect and brace the frames $f$ and $m$, and attached arms $s$ support the trip-shaft $t$. An arm, $u$, secured at its front end to the reel-post $v$, supports the shaft and fingers of the float $w$, whereby the grain is kept down and lightly confined as it passes from the carrier to the platform $d$. The deflectors $y$ are attached to the shaft $t$, which operates the trip $z$ when the action of the carrier has caused against the deflectors an accumulation of grain sufficient for a sheaf.

The needle-arm shaft $p$ is in the plane of the platform $d$, and the needle-arm can therefore be given adequate length and curvature without descending so far below the platform when out of action as to be objectionable in a low-down binder. I am thereby enabled to locate the platform $d$ nearer to the ground than would otherwise be possible and to slope the outer edge of said platform to facilitate the separation and discharge of the bound bundles.

The reciprocating separating-rake $k$ is carried on the crank A' at the rear extremity of the shaft $h$. The tail of said rake traverses a slot in the supporting-frame B', which is itself supported by shafts $g$ $h$ and the bracing tie-rods $r$ $r$. While the rake is out of action it stands in a nearly-upright position, with its point below the platform and the back of the rake-arm opposing the advance of the incoming grain. Its position is such that the needle-arm when it advances does so by the side of the rake $k$, and is therefore protected from contact with the grain. After the needle-arm has advanced and receded again the shaft $h$ moves again, withdrawing the rake $k$ from the grain, lifting and advancing it above the incoming grain, and causing it to descend through the grain close to the carrier, and then removing the portion so seized by the rake back to its first position, when said portion may be inclosed by the needle-arm and bound.

Having described my invention, I claim—

1. In a rear-cut low-down-platform harvester and binder, the combination of the cutting mechanism, the grain receiving and conveying platform in rear of the main wheel, the binder-table arranged near the ground and inclined rearwardly and downwardly, the binder-arm pivoted substantially in the plane of the binder-table, and the binder operating mechanism also inclined relatively to the grain-platform and arranged higher than the binder-table, substantially as and for the purposes set forth.

2. The combination, in a rear-cut low-down-platform grain-binding harvester, carrying the binding mechanism in rear of the main driving-wheel, of the needle and knotter operating shafts and binder-table inclined downward and rearward in relation to the platform-conveyer for the purpose of giving free discharge to the grain and elevating the front of the shafts and their operative mechanism to permit them to pass clear above the ground or obstructions thereon.

3. In a rear-cut low-down-platform grain-binding harvester, the combination of the shaft actuating the knotting mechanism, arranged at an angle inclining downward to the rear in relation to the grain receiving and conveying platform to permit the knotting mechanism to operate low to the ground, and the operating mechanism of the said shaft being arranged at a higher position from the ground.

4. A rear-cut low-down automatic grain-binding harvester, provided with a grain receiving and carrying platform and a grain-binding receptacle combined with the shafting to operate the entire binding mechanism arranged at an angle thereto, inclining upward and forward for the purpose of rendering it possible to place the needle near to the ground, and the gearing to actuate the shaft of the same at a higher level for the purpose of binding the grain near to the ground.

WILLIAM N. WHITELEY.

Witnesses:
   F. B. FURNISS,
   L. PHILLIPS.